United States Patent
Schliebe et al.

(10) Patent No.: US 8,459,549 B2
(45) Date of Patent: Jun. 11, 2013

(54) MAGNETIC INTERFERENCE COIL ENCIRCLING AN IDENTIFICATION CARD INPUT SLOT

(75) Inventors: Dieter Schliebe, Bad Wuennenberg (DE); Achim Mueller, Bielefeld (DE)

(73) Assignee: Wincor Nixdorf International GmbH (DE)

( * ) Notice: Subject to any disclaimer, the term of this patent is extended or adjusted under 35 U.S.C. 154(b) by 0 days.

(21) Appl. No.: 13/265,097

(22) PCT Filed: Mar. 10, 2010

(86) PCT No.: PCT/EP2010/001474
§ 371 (c)(1),
(2), (4) Date: Oct. 18, 2011

(87) PCT Pub. No.: WO2010/121685
PCT Pub. Date: Oct. 28, 2010

(65) Prior Publication Data
US 2012/0043380 A1    Feb. 23, 2012

(30) Foreign Application Priority Data
Apr. 22, 2009 (DE) .......................... 10 2009 003 815

(51) Int. Cl.
*G06K 5/00* (2006.01)
*G06K 7/08* (2006.01)

(52) U.S. Cl.
USPC ......................................... 235/380; 235/449

(58) Field of Classification Search
USPC .................................... 235/379, 380, 449
See application file for complete search history.

(56) References Cited

U.S. PATENT DOCUMENTS

| | | | |
|---|---|---|---|
| 6,230,972 B1 * | 5/2001 | Dames et al. | 235/449 |
| 6,422,475 B1 * | 7/2002 | May | 235/492 |
| 7,240,827 B2 * | 7/2007 | Ramachandran et al. | 235/379 |
| 2007/0131768 A1 * | 6/2007 | Wakabayashi | 235/449 |
| 2009/0050699 A1 * | 2/2009 | Basar et al. | 235/436 |
| 2009/0159676 A1 * | 6/2009 | Schliebe et al. | 235/436 |

FOREIGN PATENT DOCUMENTS

| | | |
|---|---|---|
| DE | 10 2005 043317 B3 | 4/2007 |
| EP | 1 067 474 A2 | 1/2001 |
| EP | 17 98 662 A1 | 6/2007 |
| WO | WO-2006001781 A1 | 1/2006 |
| WO | WO 2007048649 A1 * | 5/2007 |
| WO | WO 2007137919 A1 * | 12/2007 |
| WO | WO-2010000004 A1 | 1/2010 |

OTHER PUBLICATIONS

Svigals J.: "Unauthorized Card Stripe Reading Inhibitor", IBM Technical Disclosure Bulletin, International Business Machines Corp., (Thornwood), US vol. 26, No. 6, Nov. 1, 1983, p. 2707, XP002145300, ISSN: 0018-8689 (in English).

* cited by examiner

*Primary Examiner* — Thien M Le
*Assistant Examiner* — Toan Ly
(74) *Attorney, Agent, or Firm* — Harness, Dickey & Pierce, P.L.C.

(57) ABSTRACT

A self-service device (1), specifically an automated teller machine, account statement printer, and/or information or transaction terminal, with a base housing (2), an operator interface (3), an input device for identification cards (9), a magnetic interference unit (8) and one or more additional components (4, 5, 6) where the magnetic interference unit (8) is configured as a coil enclosing the input and/or output device for identification cards (9).

14 Claims, 2 Drawing Sheets

MAGNETIC INTERFERENCE COIL ENCIRCLING AN IDENTIFICATION CARD INPUT SLOT

CROSS-REFERENCE TO RELATED APPLICATIONS

This application is a National Stage of International Application No. PCT/EP2010/001474, filed Mar. 10, 2010, and published in German as WO/2010/121685 on Oct. 28, 2010. This application claims the benefit and priority of German application 10 2009 003 815.9, filed Apr. 22, 2009. The entire disclosures of the above applications are incorporated herein by reference.

BACKGROUND

This section provides background information related to the present disclosure which is not necessarily prior art.

1. Technical Field

The invention relates to a self-service device.

2. Discussion

Such self-service devices are known in the form of cash dispensers, specifically automated teller machines, or account statement printers and information and transaction terminals in the most varied embodiments. The base housing of such a self-service device is designed to match its specific purpose. The operator interface is arranged in a position ergonomically favorable to the user. The components of the control panel may be input and output devices, display equipment and keypads.

Input devices may be magnetic card readers and cash deposit devices, for example. Output devices may be designed for the purpose of issuing bank notes and/or account statements, receipts and similar. The display equipment is customarily monitors and/or displays.

The keypad serves to enter number combinations to perform the specific transaction of the user. The keypad does not have to be configured as keys moved by contact but can also be integrated into the display as a touch screen and be located next to, above or below the monitor.

Persons acting in a fraudulent manner preferably attempt in diverse ways to spy out the PIN entered by the user at automated teller machines and at the same time to copy the magnetic card inserted by the user using skimming modules. Skimming is understood to mean a method of illegally spying on the data of identification cards such as credit cards or bank cards. Data from the magnetic stripe on the card are read and then copied to counterfeit cards.

In order to prevent skimming, it is possible to generate magnetic interference signals in the proximity of the card entry slot that are injected into the magnetic reading heads of skimming modules. The magnetic coupling interferes with the reading of the magnetic stripe on the magnetic card. Because data cannot be read from a magnetic card in the presence of such magnetic interference signals, or they are data of inadequate quality, such attempts at copying can be prevented by this kind of magnetic interference.

The magnetic interference signals mentioned above are generated with the help of electronics and by means of a coil that is arranged in the vicinity of the card entry slot, and emitted as magnetic interference. Usually such a coil consists of a wire winding that is arranged on a ferrite core to increase inductance. The position of the coil is particularly important for effective coupling with the reading head of a skimmer because the position of the magnetic stripe on a magnetic card may be different. So in order to prevent skimming effectively, several coils have to be arranged at specific positions in the proximity of the card entry slot, which is associated with a considerable expenditure of installation time and increased material costs.

An object of the present invention is, therefore, to prepare a self-service device in which attempted fraud by skimming is prevented in a cost-effective manner.

In accordance with the invention, the magnetic interference unit of the self-service device is configured as a coil surrounding the entry slot for identification cards. The advantage of this arrangement is that it is equally effective for all layers of the magnetic stripe of a magnetic card. In addition, in this embodiment the magnetic interference unit can be positioned closer to the input device for identification cards. The effectiveness of the radiation of interference is increased by this means so that the energy consumption to radiate the interference can be reduced compared with conventional interference devices.

In accordance with an advantageous embodiment, the magnetic interference unit is configured as a print coil. This involves a coil imprinted or etched on a printed circuit board which can be produced at particularly low cost.

The print coil is configured in multiple layers in a particularly preferred configuration. The multiple layer configuration provides greater inductance for the coil.

In accordance with a further special variation of the embodiment, a ferromagnetic element, specifically a metal plate, is arranged between the magnetic interference unit and the base housing of the self-service device. This has the advantage that magnetic interference is attenuated in the direction of the interior of the self-service device and is concentrated or intensified forward in the direction of a skimming module applied to the housing of the self-service device.

In accordance with a further preferred embodiment at least one lighting element to illuminate the input and/or output device for identification cards is arranged on the printed circuit board of the magnetic interference unit configured as a print coil.

BRIEF DESCRIPTION OF THE DRAWINGS

Preferred embodiments of the invention will be described in more detail hereinafter using the attached drawings.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

In the following description of the Figures, terms such as top, bottom, left, right, front, rear, etc., refer exclusively to the representation and position of the self-service device and other parts shown as an example in the respective Figures. These terms are not to be understood in a restrictive sense, that is to say in different operating positions or as the result of a mirror-image layout or the like these references can change.

Figure 1:
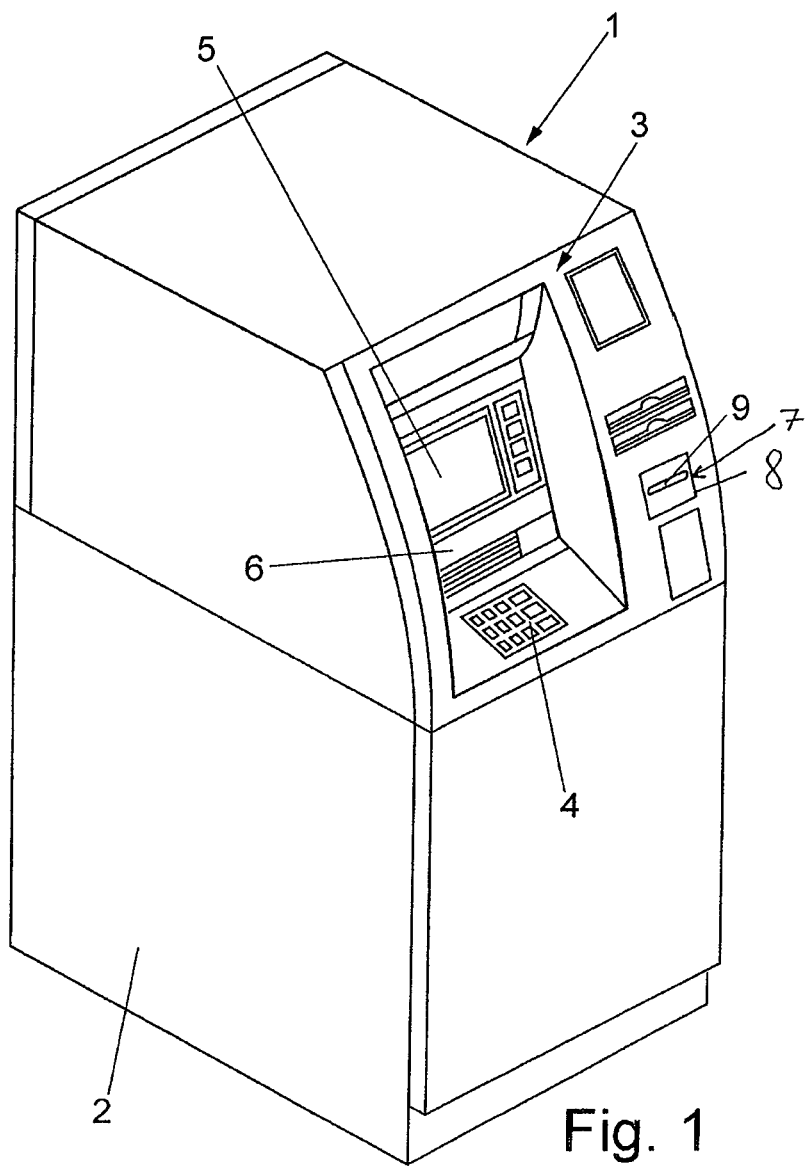
FIG. 1 shows a preferred embodiment of a self-service device in accordance with the invention in the form of an automated teller machine.
Figure 2:
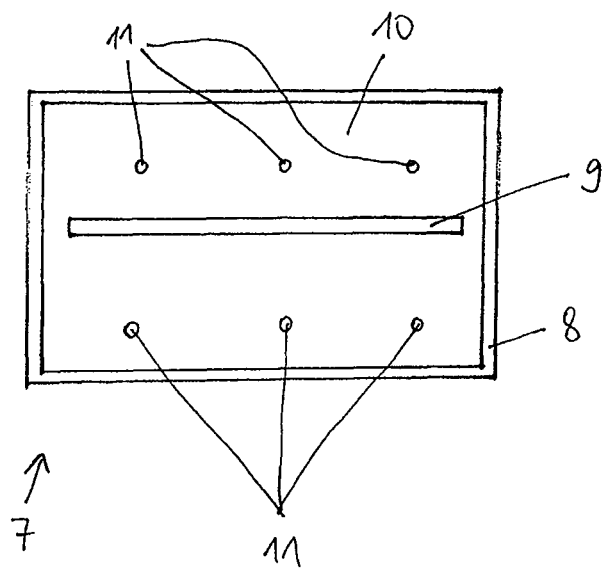
FIG. 2 shows a schematic detailed view of an input device for identification cards with a coil arranged to surround said device.
Figure 3:
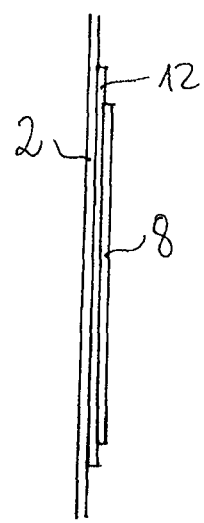
FIG. 3 shows a schematic side sectional view of the housing section of an embodiment of a self-service device in the area of the input device for identification cards.

The self-service device 1 shown in FIG. 1 is equipped with a base housing 2. In the embodiment shown an operator interface 3 with a keypad 4 of an input and/or output device 6 for currency notes, an input device 7 for identification cards and a monitor 5 is provided on the user's side. The input device 7 for identification cards is preferably configured as a card slot 9 in the base housing 2, the identification cards are bank cards, for example, made up as magnetic cards and having a magnetic stripe on which various data of the owner of the identification card are stored.

A magnetic interference unit 8 is arranged around said slot 9, configured as a coil enclosing the input device 7 for ID cards which is designed as a slot 9, said unit being electrically connected with an electronics system (not shown). With the aid of this electronics system, magnetic interference signals are radiated from the surrounding coil that are capable of coupling with the magnetic reading heads of skimming modules mounted on a slot 9.

The magnetic interference unit 8 configured as a enclosing coil is designed in a first embodiment as a wound coil.

In an alternative embodiment, the enclosing coil designed as a magnetic interference unit 8 is a print coil imprinted or etched onto a printed circuit board 10 to increase the inductance of a preferably multilayer print coil.

In order to increase the inductance even more, a planar ferromagnetic element 12, preferably configured as a metal plate, can be arranged behind the coil, that is, between the magnetic interference unit 8 and the base housing 2 of the self-service device 1. By arranging such a planar ferromagnetic element 12 between the magnetic interference unit 8 and the base housing 2 of the self-service unit 1, interference in the direction of the interior of the self-service device 1 is firstly attenuated and secondly advantageously concentrated or intensified forwards in the direction of a skimmer positioned on the housing 2 of the self-service device 1.

Preferably at least one lighting element 11 to illuminate the input device 7 for identification cards is arranged on a printed circuit board 10 of the magnetic interference unit print coil. This lighting element 11 is designed as a light-emitting diode to minimize energy consumption and for extended durability. The configuration of the magnetic interference unit 8 thus has the additional advantage that additional functional electronic elements can be arranged on the printed circuit board 10 on which the print coil is imprinted or etched, without additional space or assembly requirements for the housing 2 of the self-service device 1.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A self-service device, specifically an automated teller machine, account statement printer, and/or information or transaction terminal, with a base housing, an operator interface, an input device for identification cards, a magnetic interference unit and one or more additional components, comprising wherein the magnetic interference unit is configured as a coil surrounding the input device for identification cards and located on an outer surface of the base housing.

2. The self-service device according to claim 1, wherein the magnetic interference device is configured as a wound coil.

3. The self-service device according to claim 1, wherein the magnetic interference device is configured as a print coil.

4. The self-service device according to claim 3, wherein the magnetic interference unit print coil is configured in multiple layers.

5. The self-service device according to claim 4, wherein at least one lighting element is arranged on a printed circuit board of the magnetic interference unit print coil to illuminate the input device for identification cards.

6. The self-service device according to claim 3, wherein at least one lighting element is arranged on a printed circuit board of the magnetic interference unit print coil to illuminate the input device for identification cards.

7. The self-service device according to claim 6, wherein the lighting element is designed as a light emitting diode.

8. The self-service device according to claim 1, wherein a planar ferromagnetic element is arranged between the magnetic interference unit and the base housing.

9. The self-service device according to claim 8, wherein the planar ferromagnetic element is configured as a metal plate.

10. Apparatus for preventing fraudulent skimming of information stored on magnetic stripes of identification cards by way of skimming modules, said apparatus comprising:
   a housing having an interior and an outer surface;
   an input device on the outer surface, said input device having a slot for receiving identification cards;
   a magnetic interference unit for radiating magnetic interference to magnetic reading heads of a skimming module that may be mounted adjacent the slot, the magnetic interference unit being configured to prevent reading of the information on the identification cards by the skimming module; and
   wherein the magnetic interference unit includes a coil on the outer surface of the housing that surrounds the slot of the input device.

11. The apparatus of claim 10 wherein the magnetic interference unit comprises a printed circuit board, with the coil being on a surface of the printed circuit board.

12. The apparatus of claim 11 which further comprises: a planar ferromagnetic plate sandwiched between the printed circuit board and the outer surface of the housing for attenuating magnetic interference from entering the interior of the housing and focusing the magnetic interference towards the skimming module.

13. The apparatus of claim 12 which further comprises: a plurality of light emitting diodes on the printed circuit board and surrounding the slot of the input device.

14. The apparatus of claim 13 wherein the housing is one of an automated teller machine, an account statement printer, an information terminal and a transaction terminal.

* * * * *